(12) United States Patent
Ashitani

(10) Patent No.: US 9,794,465 B2
(45) Date of Patent: Oct. 17, 2017

(54) IMAGE PICKUP APPARATUS AND CONTROL METHOD THEREOF

(71) Applicant: CANON KABUSHIKI KAISHA, Tokyo (JP)

(72) Inventor: Satoshi Ashitani, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 14/929,968

(22) Filed: Nov. 2, 2015

(65) Prior Publication Data
US 2016/0134801 A1 May 12, 2016

(30) Foreign Application Priority Data

Nov. 11, 2014 (JP) ................................. 2014-228714

(51) Int. Cl.
| | |
|---|---|
| H04N 5/232 | (2006.01) |
| H04N 5/225 | (2006.01) |
| H04N 21/431 | (2011.01) |
| G08B 13/196 | (2006.01) |

(52) U.S. Cl.
CPC ....... *H04N 5/23206* (2013.01); *H04N 5/2259* (2013.01); *H04N 5/23261* (2013.01); *H04N 21/4318* (2013.01); *G08B 13/1963* (2013.01); *G08B 13/19689* (2013.01)

(58) Field of Classification Search
None
See application file for complete search history.

(56) References Cited

U.S. PATENT DOCUMENTS

| | | | | |
|---|---|---|---|---|
| 5,767,645 | A * | 6/1998 | Park | G05B 19/404 |
| | | | | 318/280 |
| 6,392,693 | B1 | 5/2002 | Wakiyama et al. | |
| 6,744,461 | B1 * | 6/2004 | Wada | H04N 7/18 |
| | | | | 348/143 |
| 2003/0077082 | A1 * | 4/2003 | Ito | F16M 11/10 |
| | | | | 396/428 |
| 2004/0263681 | A1 * | 12/2004 | Teramoto | G08B 13/1963 |
| | | | | 348/375 |

(Continued)

FOREIGN PATENT DOCUMENTS

| | | |
|---|---|---|
| JP | 2000-083188 A | 3/2000 |
| JP | 2005-303806 A | 10/2005 |

*Primary Examiner* — Roberto Velez
*Assistant Examiner* — Quan Pham
(74) *Attorney, Agent, or Firm* — Cowan, Liebowitz & Latman, P.C.

(57) ABSTRACT

A network camera includes a pan driving unit and a tilt driving unit for changing a shooting direction of an imaging unit. A detection unit detects rotation angles of movable units to be driven by the pan driving unit and the tilt driving unit. A pan/tilt control unit corrects a target position of the movable unit according to a correction value according to the detected rotation angle and controls each of the driving units using a value after the correction. In addition, when masked image drawing for processing an image is performed so that a partial image of a predetermined position is not visible in the image captured by an imaging unit, an image processing unit performs a process of correcting a rotation angle detected by the detection unit according to the correction value and drawing a masked image at a mask drawing position after the correction.

17 Claims, 10 Drawing Sheets

(56) References Cited

U.S. PATENT DOCUMENTS

| | | | |
|---|---|---|---|
| 2006/0055777 A1* | 3/2006 | Ito | H04N 7/183 |
| | | | 348/143 |
| 2006/0139484 A1* | 6/2006 | Seo | H04N 5/232 |
| | | | 348/373 |
| 2009/0102920 A1* | 4/2009 | Yamanaka | G03B 13/00 |
| | | | 348/143 |
| 2014/0204230 A1* | 7/2014 | Boyle | H04N 5/23203 |
| | | | 348/211.99 |

* cited by examiner

| Angle [°] | Correction value [pulse] |
|---|---|
| −180 | 2 |
| −178 | 3 |
| −176 | 4 |
| ⋮ | ⋮ |
| 176 | 3 |
| 178 | 2 |

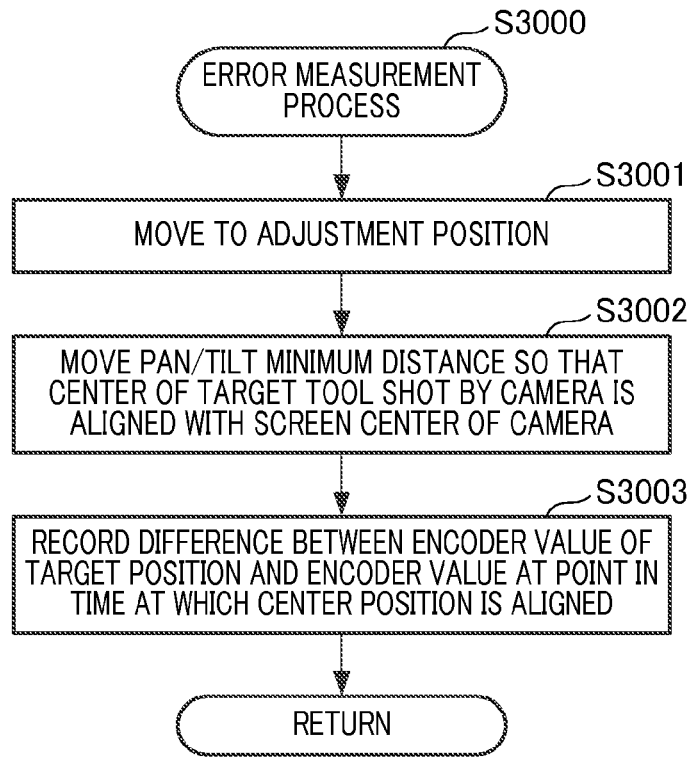
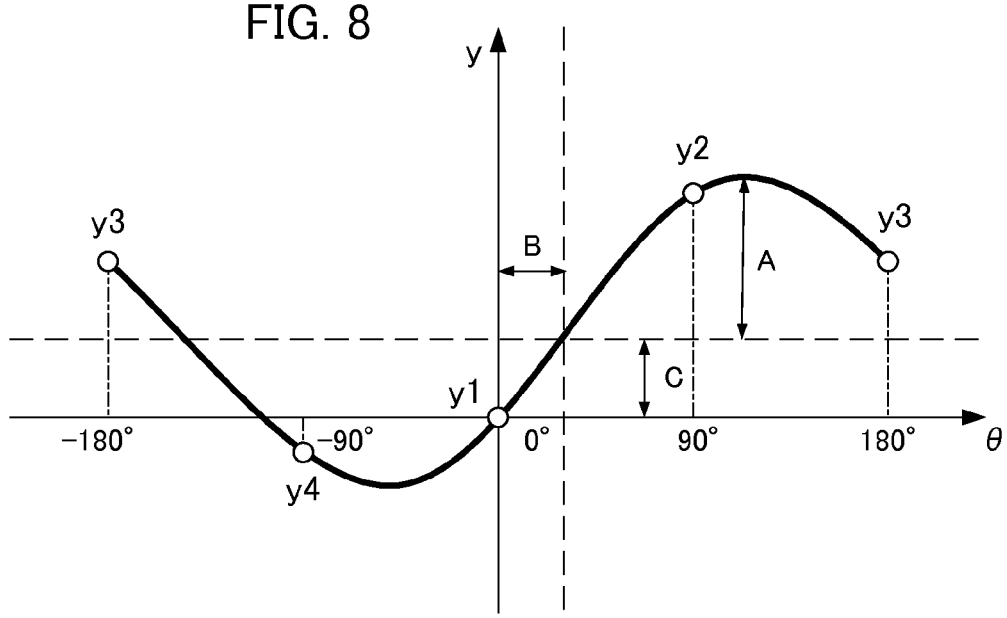

| Angle [°] | Correction value [pulse] |
|---|---|
| −180 | 2 |
| −178 | 3 |
| −176 | 4 |
| ⋮ | ⋮ |
| 176 | 3 |
| 178 | 2 |

| Angle [°] | Correction value [pulse] |
|---|---|
| −180 | 11 |
| −178 | 10 |
| −176 | 9 |
| ⋮ | ⋮ |
| 176 | 10 |
| 178 | 11 |

IMAGE PICKUP APPARATUS AND CONTROL METHOD THEREOF

BACKGROUND OF THE INVENTION

Field of the Invention

The present invention relates to an image pickup apparatus in which a shooting direction is changeable and a control method thereof.

Description of the Related Art

Conventionally, network cameras capable of controlling a camera according to a remote operation and monitoring a video via a network or a dedicated line are known. For example, there is an apparatus having a movable unit in which a camera head performs a pan (horizontal rotation) operation and a tilt (vertical rotation) operation and shooting is possible in a wide range. Further, there is an endless turning type in which rotation is possible without limitation in a range of 360 degrees without a mechanical end in the movable unit which performs the pan operation. In addition, there are a preset cyclic moving function and a privacy mask function as functions of the network camera. The preset cyclic moving function is a function of registering pan and tilt positions to be monitored by a user as preset positions in advance and cyclically moving and monitoring the registered preset positions. The privacy mask function is a function of superimposing a rectangular image on a partial region desired to be masked by the user in a shooting region to process a captured image so that the partial region is not viewed. In order to improve the performance of these functions, the improvement of stop position accuracy of the pan/tilt movable unit is required.

In the endless turning type network camera, there is an apparatus in which the movable unit for performing the pan operation rotates without limitation and a movable angle of the movable unit for performing the tilt operation is 180 degrees. Because a degree of freedom of the movable unit is high, the movable unit can be directed fully backward at 180 degrees through the pan operation and the movable unit can also be directed fully backward at 180 degrees through the tilt operation. In addition, at the time of rotating from the camera head position at which the tilt angle is 0 degrees to the camera head position at which the tilt angle is −180 degrees, the camera head turns upside down, resulting in a video in which the sky and the earth are reversed. Because users are uncomfortable watching videos in which the sky and the earth are reversed, there is an apparatus having a function (automatic flip) of outputting a video of a state in which the sky and the earth are in their correct positions by automatically reversing the video through an electronic process according to the tilt angle. For example, shooting is possible in the same shooting direction and the same sky and earth directions of the video between a camera head position of a tilt of 0 degrees at a pan of 180 degrees and a camera head position of a tilt of −180 degrees at a pan of 0 degrees. In the case of the endless turning type network camera, there are two positions which are in the same shooting direction but differ in positions of the movable unit. For a stop position error between the two different positions, there are more causes of the error than with a stop position error for one position. Thus, when the error is comparatively large, the stop position error of the movable unit occurs. For example, a shift is likely to occur in the shooting direction of a preset position in the preset cyclic moving function and a shift is likely to occur at a drawing position of a privacy mask.

In Japanese Patent Laid-Open No. 2005-303806, a method of performing accurate preset shooting even when the accuracy of a movement mechanism is low is disclosed. This method is a method of adjusting a trimming region so that trimming mark information registered at the time of preset position registration is reproduced after moving to a registered preset position at the time of returning to the preset position. In addition, in the publication of Japanese Patent Laid-Open No. 2000-83188, a method in which monitoring is also performed in an opposite direction by automatically turning a camera head in a horizontal direction 180 degrees according to the pan operation when the camera head moves in a vertical direction according to the tilt operation and is directed directly downwardly is disclosed.

In the conventional technology disclosed in Japanese Patent Laid-Open No. 2005-303806, image processing is necessary when the trimming region is adjusted so that registered trimming mark information is reproduced. Thus, processing load and processing time are necessary according to the image processing. In addition, because the trimming process is performed, a shooting range of an image to be distributed is narrowed for an imaging range of an imaging element. In addition, in conventional technology disclosed in the publication of Japanese Patent Laid-Open No. 2000-83188, a problem of the stop position error between the above-described two positions (two positions which are in the same shooting direction but differ in positions of the movable units) does not occur because an automatic flip operation is performed according to the rotation of the movable unit rather than the rotation of the image. However, a period in which control is difficult or a period in which monitoring is difficult occurs while a reversing operation of the movable unit occurs in the automatic flip according to the rotation of the movable unit. Thus, as compared with the automatic flip by image rotation, there is concern of the controllability or monitor ability being impaired.

In addition, when the privacy mask is drawn, it is necessary to follow a drawing position according to a change in the shooting direction in association with the pan/tilt operation. That is, an error of pan/tilt position information to be used in the drawing of the privacy mask becomes a cause of the drawing position error of the privacy mask.

SUMMARY OF THE INVENTION

The present invention improves accuracy by reducing a stop position error of a movable unit or a drawing position error of a mask in an image pickup apparatus capable of changing a shooting direction through a plurality of movable units.

According to an exemplary embodiment of the present invention, an image pickup apparatus includes an imaging unit; a plurality of driving units configured to change a shooting direction of the imaging unit by driving each of a plurality of movable units having different driving directions; a detection unit configured to detect rotation angles of the plurality of movable units; and a driving control unit configured to acquire the rotation angles detected by the detection unit to control the plurality of driving units. The driving control unit corrects a target position of each movable unit according to a correction value corresponding to the rotation angle of the movable unit with respect to a plurality of different positions of the plurality of movable units when the imaging unit capture in the same shooting direction in order to control each driving unit by using a corrected value.

According to another exemplary embodiment, an image pickup apparatus includes an imaging unit; a plurality of driving units configured to change a shooting direction of the imaging unit by driving each of a plurality of movable units having different driving directions; a detection unit configured to detect rotation angles of the plurality of movable units; and an image processing unit configured to process an image captured by the imaging unit and to perform a process of drawing partially masked image to the image. The image processing unit corrects a rotation angle detected by the detection unit using a correction value corresponding to a rotation angle of each movable unit with respect to a plurality of different positions of the plurality of movable units when the imaging unit capture in the same shooting direction in order to perform a process of drawing the masked image at a drawing position calculated by using a corrected value.

Further features of the present invention will become apparent from the following description of exemplary embodiments (with reference to the attached drawings).

BRIEF DESCRIPTION OF THE DRAWINGS

FIG. 7 is a flowchart illustrating an error measurement process in the correction value adjustment process of the image pickup apparatus according to an embodiment of the present invention.

FIG. 8 is a diagram illustrating a correction value according to sinusoidal wave interpolation.

DESCRIPTION OF THE EMBODIMENTS

Hereinafter, embodiments of the present invention will be described in detail based on the accompanying drawings. In each embodiment, a network camera will be described as an example of an image pickup apparatus having a plurality of driving units configured to change a shooting direction of an imaging unit by driving each of a plurality of movable units having different driving directions. In this case, the plurality of driving units include a first driving unit configured to drive a first movable unit related to a panning operation and a second driving unit configured to drive a second movable unit related to a tilting operation, and a driving control unit for the first and second driving units is provided. Each driving unit changes the shooting direction of the imaging unit by driving a corresponding movable unit in each driving direction. Further, the present invention is applicable to various types of optical apparatuses capable of performing driving control to change the shooting direction of the imaging unit through a plurality of driving units having different driving directions in a wide range.

First Embodiments

Hereinafter, first embodiments of the present invention will be described with reference to FIGS. 1 to 9.

Figure 1:
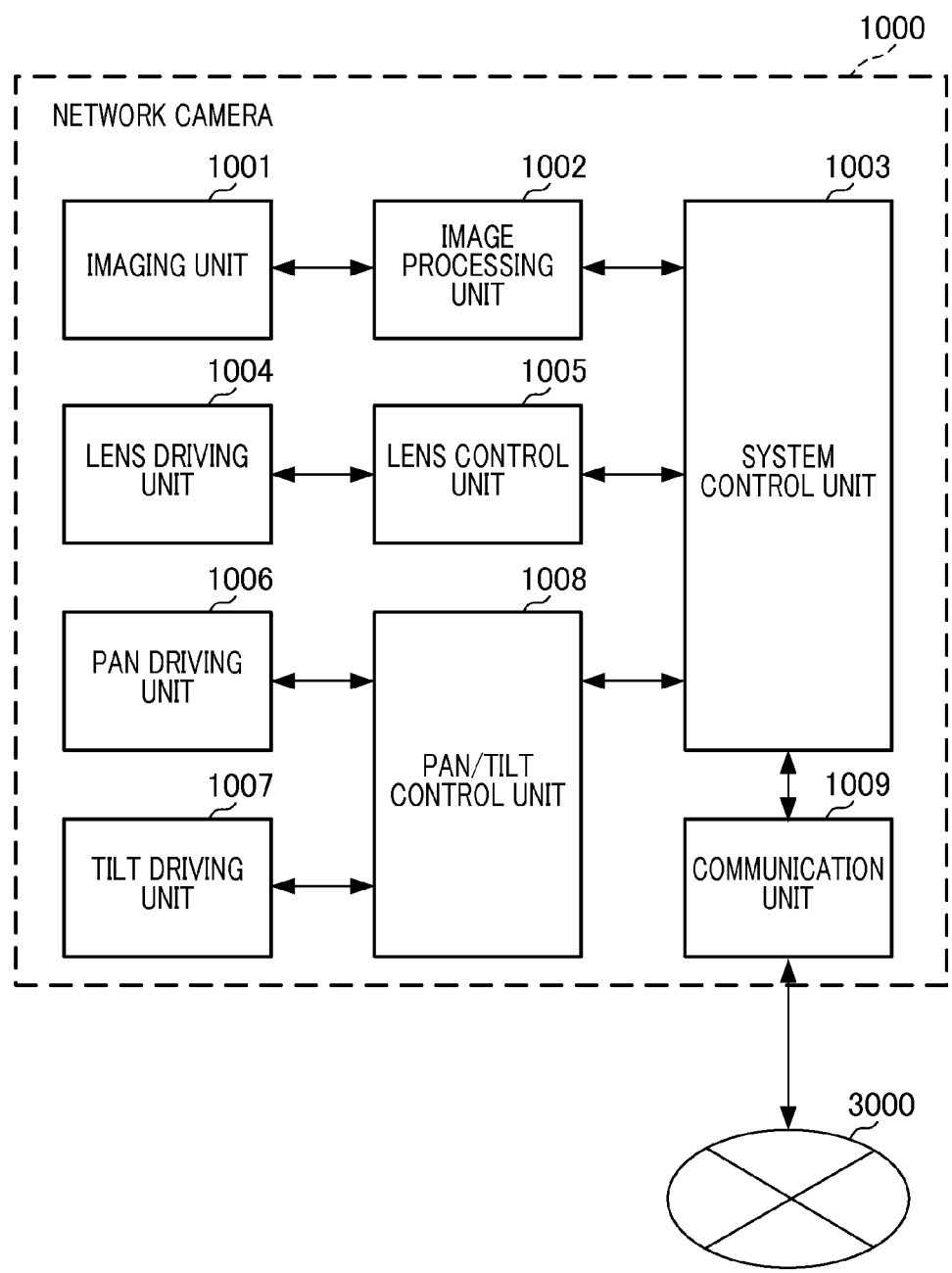
FIG. 1 is a functional block diagram of an image pickup apparatus according to an embodiment of the present invention.

FIG. 1 is a functional block configuration diagram of a network camera according to this embodiment. The network camera 1000 is connected to a client apparatus (information processing apparatus) via a network 3000 in a mutually communicable state. The network camera 1000 includes an imaging unit 1001, an image processing unit 1002, a system control unit 1003, a lens driving unit 1004, a lens control unit 1005, a pan driving unit 1006, a tilt driving unit 1007, and a pan/tilt control unit 1008. Further, panning of the image pickup apparatus will be abbreviated as "pan" and tilting of the image pickup apparatus will be abbreviated as "tilt." The first movable unit related to the panning operation of the image pickup apparatus is referred to as a pan movable unit, the second movable unit related to the tilting operation is referred to as a tilt movable unit, and the first and second movable units are collectively referred to as a pan/tilt movable unit.

Configurations and functions of parts of the network camera 1000 will be described with reference to FIG. 1. The imaging unit 1001 is constituted of a lens and an imaging element and performs imaging of a subject and conversion of an image of the subject into an electrical signal. The image processing unit 1002 performs a predetermined developing process, a privacy mask drawing process, a compression encoding process, etc., on an imaging signal photo-electrically converted by the imaging unit 1001, and generates image data. The communication unit 1009 transmits image data generated by the image processing unit 1002 to a client apparatus 2000 (not illustrated) via the network 3000. In addition, the communication unit 1009 receives a camera control command transmitted from the client apparatus to deliver the camera control command to the system control unit 1003. The communication unit 1009 transmits a response for the command to the client apparatus.

The system control unit 1003 includes a central processing unit (CPU), etc., analyzes the camera control command acquired from the client apparatus, and executes a process according to the command. For example, the system control unit 1003 performs an instruction of image quality adjustment for the image processing unit 1002, an instruction of zoom control or focus control for the lens control unit 1005, or an instruction of the pan/tilt operation for the pan/tilt control unit 1008.

The lens control unit 1005 controls the lens driving unit 1004 according to the instruction from the system control unit 1003. The lens driving unit 1004 is constituted of driving systems of a focus lens and a zoom lens and a motor which is a driving source and drives a movable optical member.

The pan/tilt control unit 1008 constitutes a driving control unit and controls each of the pan driving unit 1006 and the tilt driving unit 1007 according to the instruction from the system control unit 1003. The pan driving unit 1006 includes a mechanical driving system (mechanism unit) configured to perform the pan operation, a motor which is a driving source, and an encoder (detection unit) configured to detect a rotation angle of the pan movable unit. The tilt driving unit 1007 includes a mechanical driving system configured to perform the tilt operation, a motor which is a driving source, and an encoder configured to detect a rotation angle of the tilt movable unit.

Figure 2A:
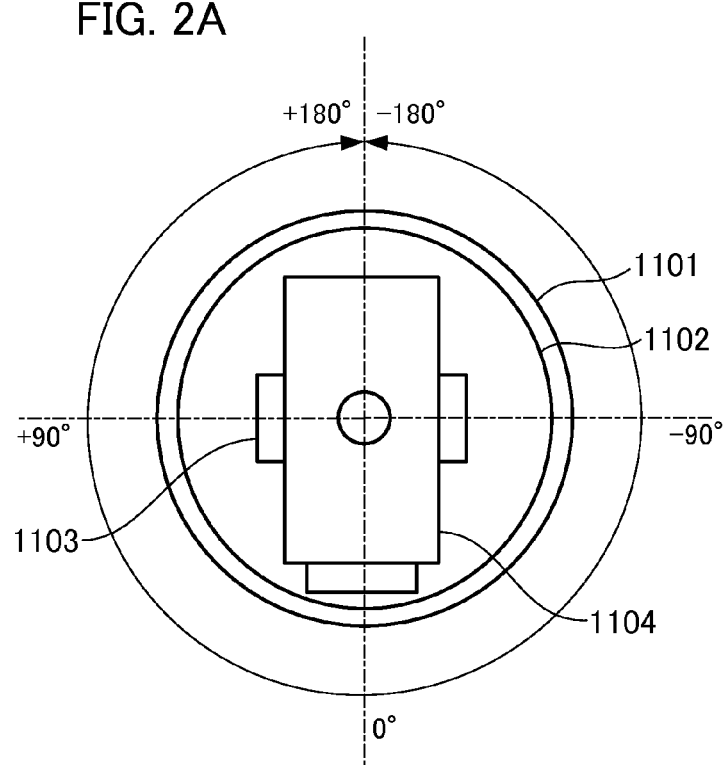
FIGS. 2A and 2B are diagrams illustrating mechanism units of the image pickup apparatus according to an embodiment of the present invention.
Figure 2B:
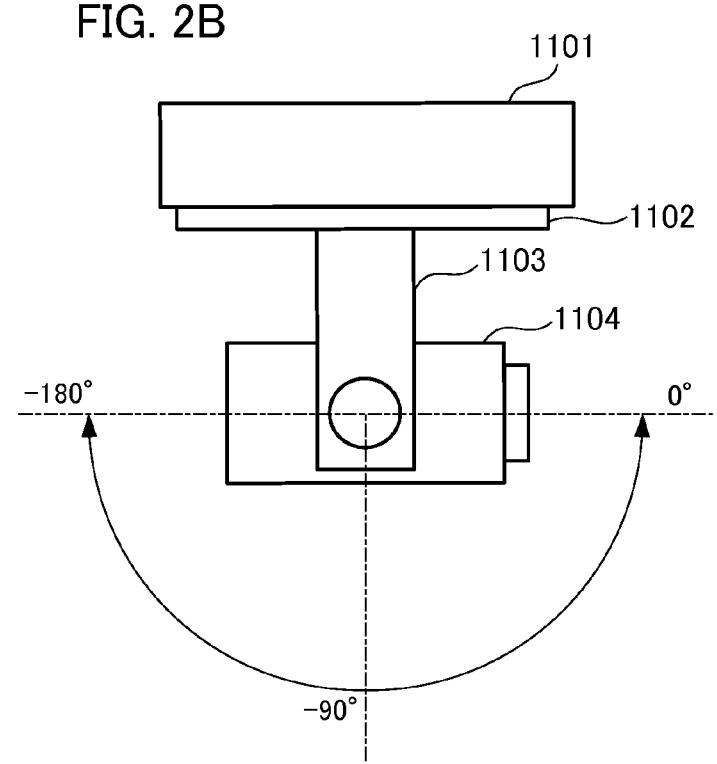

FIG. 2 is a mechanical mechanism diagram of the network camera in which a pan/tilt operation is possible according to this embodiment. FIG. 2A is a diagram of the network camera 1000 when viewed from a lower surface side and FIG. 2B is a diagram of the network camera 1000 when viewed from a side surface. In FIG. 2, a bottom case 1101 and a turntable 1102 of the network camera 1000 are disposed on an upper side and a camera head 1104 is attached to a camera head support 1103. An axis of a vertical direction is defined as a vertical axis, an axis orthogonal to the vertical axis is defined as a horizontal axis, and an operation of the pan/tilt movable unit will be described with reference to FIG. 2. Further, a clockwise direction about the vertical axis orthogonal to the paper surface is set as a positive direction of a pan angle in FIG. 2A, and a counterclockwise direction about the axis orthogonal to the paper surface is set as a positive direction of the tilt angle in FIG. 2B.

The pan movable unit is constituted of the bottom case 1101 and the turntable 1102, and the turntable 1102 rotates about the vertical axis. In addition, because electric circuits configured in a fixing unit of the bottom case 1101 and a rotating unit of the turntable 1102 are connected through a slip ring or the like, the pan movable unit can endlessly rotate in an angle range of 360 degrees within a plane including the horizontal axis. In addition, because a pan encoder is attached to the turntable 1102 and a circular pan encoder scale for measuring a movement amount of the pan encoder is attached to the bottom case 1101, a rotation angle of the pan movable unit is detected by the pan encoder and the circular pan encoder scale.

The tilt movable unit is constituted of the camera head support 1103 and the camera head 1104, and the camera head 1104 rotates about the horizontal axis. The tilt movable unit can rotate −90 degrees in a directly downward direction based on a horizontal direction (0 degrees) and further rotate to −180 degrees in another horizontal direction. In addition, because a tilt encoder is attached to the camera head 1104 and a circular tilt encoder scale for measuring a movement amount of the tilt encoder is attached to the camera head support 1103, a rotation angle of the tilt movable unit is detected by the tilt encoder and the circular tilt encoder scale.

In this manner, the network camera 1000 of this embodiment can change a shooting direction when the camera head 1104 rotates in the horizontal direction and the vertical direction and perform shooting in a wide range. In addition, the network camera 1000 has an automatic flip function of outputting a video in which the sky and the earth are always in the correct positions by automatically reversing the video through electronic processing according to the tilt angle. Thereby, for example, it is possible to perform shooting in a state in which the sky/earth direction of a captured image is the same in the same shooting direction between a camera head position (first position) of a tilt of 0 degrees and a pan of 180 degrees and a camera head position (second position) of a tilt of −180 degrees and a pan of 0 degrees. However, although the first position and the second position are in the same shooting direction, positions of the movable units are different. Thus, the stop position error is likely to be comparatively large for a stop position error for one position. As one cause of the stop position error, there is a shift of an attachment position of the encoder scale. When the rotation center of the pan movable unit or the tilt movable unit and the center of the encoder scale are shifted, an error occurs between the actual rotation angle of the movable unit and the rotation angle detected by the encoder. For example, the case in which the center of the pan encoder scale is shifted to the right of FIG. 2A, that is, the side of −90 degrees, with respect to the rotation center of the pan movable unit is assumed. In this case, a detected angle (corresponding to the number of encoder pulses by the pan encoder) until the pan movable unit rotates from 0 degrees in a counterclockwise direction (negative direction) to reach −180 degrees is greater than the actual rotation angle by an amount shifted by the encoder scale to the right. When the pan movable unit is controlled based on the number of encoder pulses, the stop position at which the pan angle is −180 degrees is a stop position shifted by an error of the number of encoder pulses rather than immediately behind the position at which the pan angle is 0 degrees. Consequently, for example, a stop position error occurs between a first position of a tilt of 0 degrees and a pan of 180 degrees and a second position of a tilt of −180 degrees and a pan of 0 degrees. Therefore, in this embodiment, there is provided a correction table having a correction value for correcting the number of encoder pulses including an error at a predetermined position of the movable unit to a correct value. If the movable unit is controlled using the number of encoder pulses corrected using the correction table, it is possible to reduce the stop position error.

Figures 3, 4:
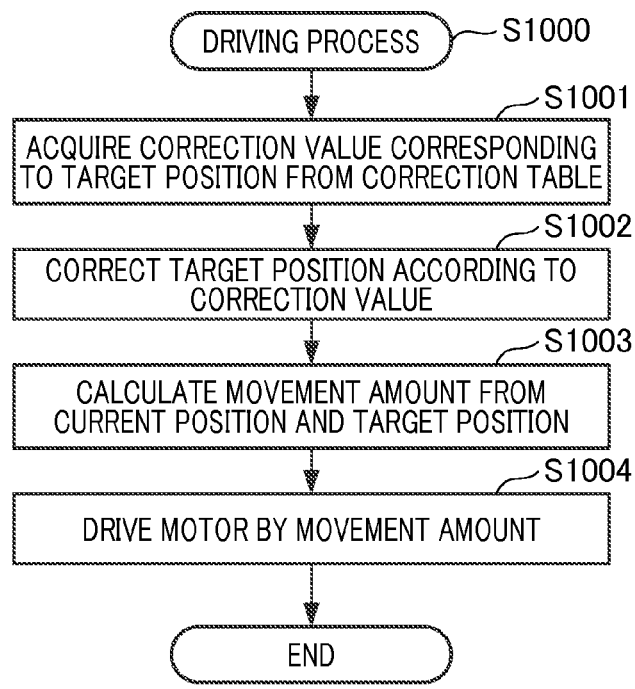
FIG. 3 is a diagram illustrating a pan correction table of the image pickup apparatus according to a first embodiment of the present invention.
FIG. 4 is a flowchart illustrating a main process in the first embodiment of the present invention.

The correction table of FIG. 3 shows an example of a correction value of the number of encoder pulses at a predetermined position (angle value) of the pan movable unit. In this table, a pan movable range is from −180 degrees to +178 degrees and correction values of the number of encoder pulses are listed in pitches of 2 degrees. For example, the correction value is "2" when a pan angle corresponding to a position of the pan movable unit is greater than or equal to −180 degrees and less than −178 degrees and the correction value is "3" when the pan angle corresponding to the position of the pan movable unit is greater than or equal to −178 degrees and less than −176 degrees. A method of generating the correction table will be described below.

FIG. 4 is a flowchart illustrating an example of a pan driving process S1000. The pan/tilt control unit 1008 performs the following process when the network camera 1000 receives a pan driving command. The pan/tilt control unit 1008 moves to a process of S1001 when the pan driving command is received.

In S1001, the pan/tilt control unit 1008 acquires the correction value corresponding to a target position using the correction table for the target position designated by the pan driving command. For example, when the target position of the pan driving command is 178 degrees, the correction value "2" of the number of encoder pulses is acquired using the correction table of FIG. 3.

In S1002, the pan/tilt control unit 1008 corrects the number of encoder pulses of the target position according to the correction value acquired in S1001. For example, an encoder scale of 3600 pulses is assumed at 360 degrees for the pan movable unit of this embodiment. In this case, the number of encoder pulses at the target position of 178 degrees becomes 178×3600/360=1780 according to a ratio of the angle value and the number of encoder pulses. When the correction value "2" is added to the value of 1780, 1780+2=1782 and a position of 1782 pulses is obtained as the target position after correction.

In S1003, the pan/tilt control unit 1008 calculates a movement amount from a current position and the corrected target position. For example, when the number of encoder pulses of the current position is 300, 1782−300=1482 according to "target position-current position" and the movement amount becomes 1482 pulses.

In S1004, the pan/tilt control unit 1008 terminates this process after control for driving the pan driving unit 1006 is performed according to the movement amount calculated in S1003. Even when a tilt driving command is received, the pan/tilt control unit 1008 similarly acquires a correction value by referring to the tilt correction table and corrects a tilt target position using the correction value. Tilt driving is executed toward the corrected target position.

In this manner, the number of encoder pulses including an error to be detected by the encoder is corrected according to a predetermined correction value and control for driving the movable unit in the number of encoder pulses after correction is performed. Thereby, it is possible to reduce the stop position error between the first and second positions which are in the same shooting direction but differ in positions of the movable units and improve stop position accuracy of the movable unit.

Figure 5A:
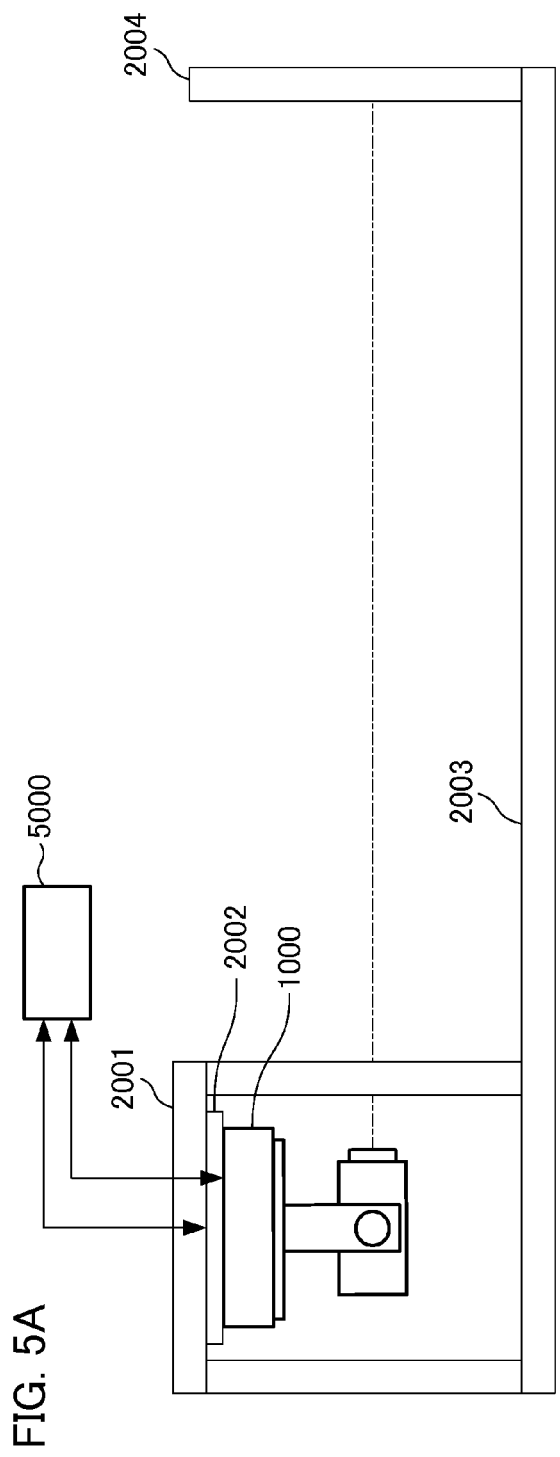
FIGS. 5A and 5B are diagrams illustrating an error adjustment tool of the image pickup apparatus according to an embodiment of the present invention.
Figure 5B:
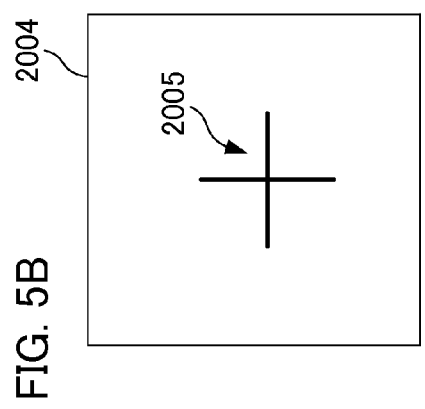

FIG. 5 is a diagram illustrating an error adjustment tool. FIG. 5A is a side view of the error adjustment tool and FIG. 5B is a front view of a target plate 2004. In FIG. 5, the network camera 1000 is attached to a camera turntable 2002 of a camera attachment mount 2001. These are disposed on a base plate 2003 and the target plate 2004 is disposed in a place separated by a predetermined distance. A target 2005 is assumed to be marked in a cross shape on the target plate 2004.

As illustrated in FIG. 5A, the network camera 1000 can be attached to the camera attachment mount 2001 in a hanging state. A mark position of the target 2005 on the target plate 2004 is a position that will be the center of a captured image when the network camera 1000 attached to the camera attachment mount 2001 shoots the target plate 2004. That is, the position of the center of the cross serves as a reference position for error adjustment. The network camera 1000 attached to the camera attachment mount 2001 shoots the target plate 2004. At this time, it is possible to measure an error between the detection position in the encoder and the reference position by measuring an error between the center of the captured image and the center of the cross of the target 2005 of the target plate 2004. Further, the target 2005 is set as the cross and its intersection is set as a reference point in this embodiment, but the present invention is not limited thereto. For example, the target may be in the form of a dot shape.

The camera turntable 2002 is capable of rotating 360 degrees within a horizontal plane for the camera attachment mount 2001 and the attached network camera 1000 may direct a shooting direction to any angle in a horizontal direction for the target plate 2004. Thereby, the network camera 1000 may measure an error value at any angle of the pan movable unit. Further, the network camera 1000 attached to the error adjustment tool and the error adjustment tool are connected to an error adjustment client apparatus (information processing apparatus) 5000. The error adjustment client apparatus 5000 performs video display of the network camera 1000, a pan/tilt driving instruction, and control of the camera turntable 2002 of the error adjustment tool.

Figure 6:
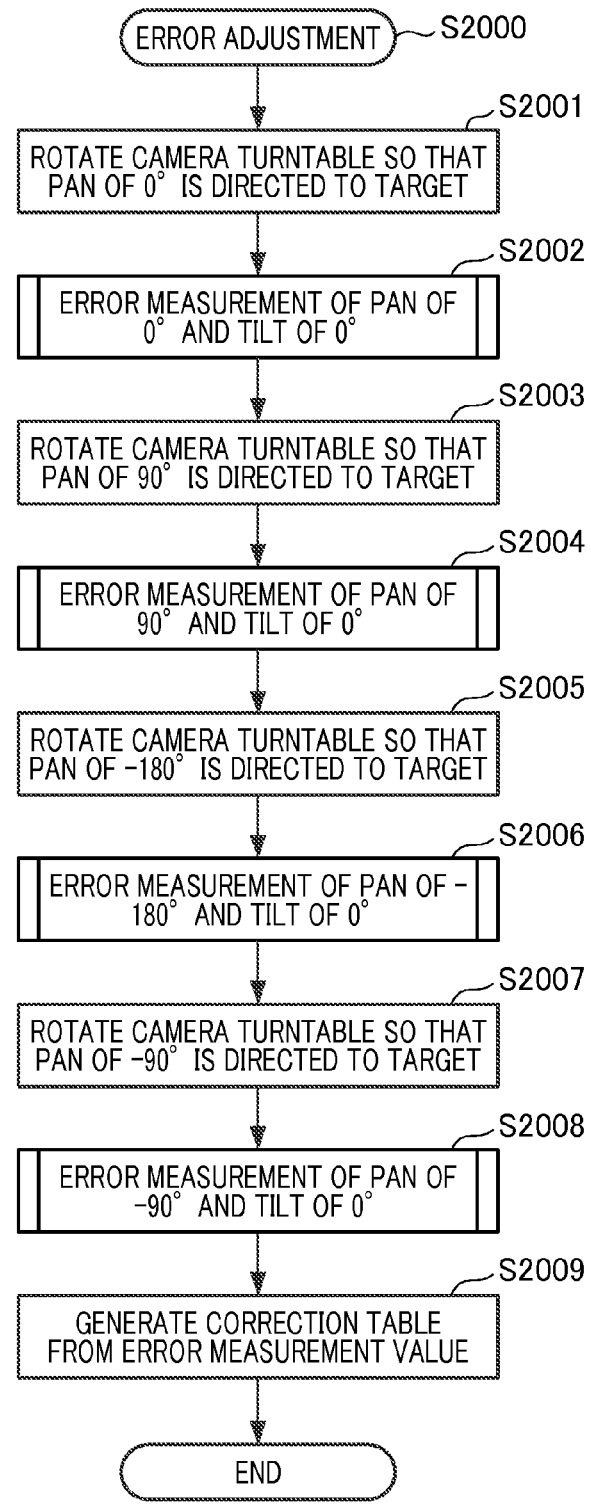
FIG. 6 is a flowchart illustrating a correction value adjustment process of the image pickup apparatus according to an embodiment of the present invention.

An error adjustment process S2000 by the error adjustment client apparatus (hereinafter referred to as an adjustment apparatus) 5000 will be described with reference to a flowchart of FIG. 6.

In S2001, the adjustment apparatus 5000 rotates the camera turntable 2002 of the error adjustment tool so that a direction of a pan of 0 degrees is directed to the target plate 2004. In S2002, the adjustment apparatus 5000 performs error measurement at a camera head position at the pan of 0 degrees and a tilt of 0 degrees. The error measurement process will be described below using a flowchart of FIG. 7.

In S2003, the adjustment apparatus 5000 rotates the camera turntable 2002 of the error adjustment tool so that the direction of a pan of 90 degrees is directed to the target plate 2004. In S2004, the adjustment apparatus 5000 performs error measurement at the camera head position at the pan of 90 degrees and the tilt of 0 degrees. In S2005, the adjustment apparatus 5000 rotates the camera turntable 2002 of the error adjustment tool so that the direction of a pan of −180 degrees is directed to the target plate 2004. In S2006, the adjustment apparatus 5000 performs error measurement at the camera head position at the pan of −180 degrees and the tilt of 0 degrees. In S2007, the adjustment apparatus 5000 rotates the camera turntable 2002 of the error adjustment tool so that the direction of a pan of −90 degrees is directed to the target plate 2004. In S2008, the adjustment apparatus 5000 performs error measurement at the camera head position at the pan of −90 degrees and the tilt of 0 degrees. In S2009, the adjustment apparatus 5000 generates a correction table using an error measurement value. Error measurement processes in steps S2004, S2006, and S2008 are similar to S2002 except that the target position (error adjustment position) is different. A flowchart of subroutine S3000 of the error measurement process is illustrated in FIG. 7.

In S3001, the adjustment apparatus 5000 moves the pan/tilt position of the network camera 1000 to the error measurement position. For example, in the case of S2002 of FIG. 6, the movement to the pan of 0 degrees and the tilt of 0 degrees as the error adjustment position is performed. In S3002, the adjustment apparatus 5000 moves the pan/tilt movable unit by a very small distance so that the center of a captured screen of the network camera 1000 is aligned with the center of the shot target 2005. In S3003, the adjustment apparatus 5000 calculates a difference between the number of encoder pulses of the target position and the number of encoder pulses at a shooting position at which the shooting center matches the center position of the target 2005. For example, when an angle corresponding to the target position is 0 degrees, the number of encoder pulses of the target position is 0. When the number of encoder pulses at the target position at which the center position of the target 2005 matches the shooting center is 3, the error value is 0−3=−3. When this error value is calculated and stored in a memory, the process of the subroutine S3000 ends and moves to a return process.

Next, a process (S2009 of FIG. 6) of generating the correction table using the error measurement value will be described in detail with reference to FIG. 8. In this embodiment, a method of acquiring an error measurement value at a predetermined angle and obtaining a correction value at any angle by performing interpolation according to a sinusoidal wave will be described. In FIG. 8, the horizontal axis represents a rotation angle θ corresponding to the position of the pan movable unit and the vertical axis represents an error value y. As described above, the cause of error is shifts of the rotation center of the movable unit and the center of the encoder scale. In this case, the error value is shown in a sinusoidal wave shape of one cycle at a rotation angle of 360 degrees of the movable unit as illustrated in FIG. 8. The amplitude of the sinusoidal wave is denoted by A and the offset of the y-axis direction indicating the error value is denoted by C. The phase in the θ axis indicating the rotation angle of the pan movable unit is denoted by B. The error value at any rotation angle of the pan movable unit is shown in the following Formula (0).

[Math 1]

$$y = A\sin(\theta - B) + C \qquad (0)$$

y1 to y4 shown in FIG. 8 are as follows.
y1: error value when the pan angle is 0 degrees.
y2: error value when the pan angle is 90 degrees.
y3: error value when the pan angle is −180 degrees.
y4: error value when the pan angle is −90 degrees.

When the error value of each point is expressed by Formula (0), the error values are as follows:

$$y1 = A\sin(0 - B) + C$$

$$y2 = A\sin(90 - B) + C$$

$$y3 = A\sin(-180 - B) + C$$

$$y4 = A\sin(-90 - B) + C \qquad [\text{Math 2}]$$

The above four formulas can be modified as follows:

[Math 3]

$$y1 = -A\sin(B) + C \qquad (1)$$

$$y2 = A\cos(B) + C \qquad (2)$$

$$y3 = A\sin(B) + C \qquad (3)$$

$$y4 = -A\cos(B) + C \qquad (4)$$

Based on a relationship of Formulas (1) to (4), calculation formulas of the amplitude A, the phase B, and the offset C can be derived. First, a method of calculating the amplitude A will be described.

The result of Formula (1)−Formula (3) is as follows:

$$y1 - y3 = -2A\sin(B) \qquad [\text{Math 4}]$$

The result of Formula (2)−Formula (4) is as follows:

$$y2 - y4 = 2A\cos(B) \qquad [\text{Math 5}]$$

A sum of the square of Formula (1)−Formula (3) and the square of Formula (2)−Formula (4) is as follows:

$$(y1 - y3)^2 + (y2 - y4)^2 = 4A^2(\sin^2(B) + \cos^2(B)) \qquad [\text{Math 6}]$$

Math 8 is obtained from Math 7 and the amplitude A of the sinusoidal wave can be derived from the error values y1, y2, y3, and y4.

$$\sin^2(B) + \cos^2(B) = 1 \qquad [\text{Math 7}]$$

$$A = \frac{\sqrt{(y1 - y3)^2 + (y2 - y4)^2}}{2} \qquad [\text{Math 8}]$$

Next, a method of deriving the phase B will be described. Formula (1) is modified to obtain Math 9.

(1A)

$$\frac{-(y1 - C)}{A} = \sin(B) \qquad [\text{Math 9}]$$

Formula (2) is modified to obtain Math 10.

(2A)

$$\frac{y2 - C}{A} = \cos(B) \qquad [\text{Math 10}]$$

The result of dividing Formula (1A) by Formula (2A) is as follows:

$$\frac{-(y1 - C)}{y2 - C} = \frac{\sin(B)}{\cos(B)} = \tan(B) \qquad [\text{Math 11}]$$

The above formula can be converted into Math 12. The phase B of the sinusoidal wave can be derived using an arctangent function from the error values y1 and y2 and the offset C.

$$B = \tan^{-1}\left(\frac{-(y1 - C)}{y2 - C}\right) \qquad [\text{Math 12}]$$

Finally, a method of deriving the offset C will be described.

Math 13 is obtained from Formula (1)+Formula (3). Math 13 can be modified into Math 14. The offset C can be derived from the error values y1 and y3.

$$y1 + y3 = 2C \qquad [\text{Math 13}]$$

$$C = \frac{y1 + y3}{2} \qquad [\text{Math 14}]$$

The parameters A, B, and C are derived as described above, and the correction value can be derived at any angle of the pan movable unit when Formula (0) is used. That is, a table in which a correction value is listed at every angle is generated by obtaining a correction value at a predetermined angle for every predetermined pitch angle across a range from −180 degrees to +180 degrees which is a rotation angle range of the pan movable unit using the above-described calculation formulas. For the number of listed pieces of data included in the correction table, the more accurate error value can be reflected when an angle pitch is finer and the number of listed pieces is larger. However, because an increase in the number of listed pieces leads to an increase in memory consumption used in the table, it is only necessary to determine an appropriate value according to the balance thereof.

When the variation of the correction value by an individual difference of the camera is small, it is possible to hold data of the correction table as a fixed value in view of a design value or an actually measured value. On the other hand, when the variation of the correction value occurs to some extent according to an individual difference of the camera, it is only necessary to individually generate the correction table by performing error adjustment for every individual camera using the above-described error adjustment method or the like.

In this embodiment, the stop position is corrected using correction values at two positions (for example, a first position of a tilt of −180 degrees at a pan of 0 degrees and a second position of a tilt of 0 degrees at a pan of −180 degrees) which are in the same shooting direction but differ in positions of the movable units. Consequently, it is possible to improve stop position accuracy by reducing a stop position error of the movable unit between the two different positions.

Figures 9, 10A, 10B:
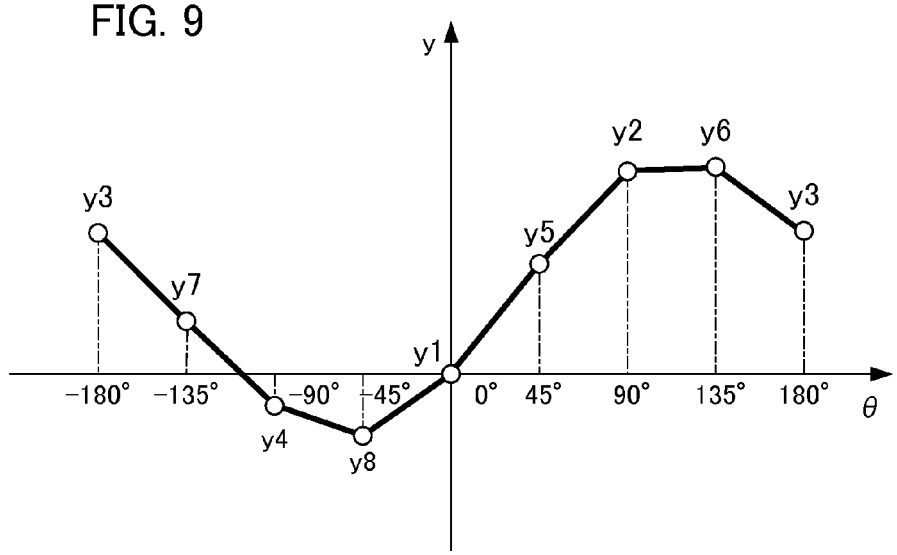
FIG. 9 is a diagram illustrating a correction value according to linear interpolation.
FIGS. 10A and 10B are diagrams illustrating a pan correction table of the image pickup apparatus according to a second embodiment of the present invention.

Further, a method of generating the correction table by interpolating a sinusoidal wave from data of four points measured when the correction table is generated has been described in this embodiment, but the present invention is not limited thereto. For example, an interpolation and generation method using data at four or fewer points or five or more points may be used. In addition, as illustrated in FIG. 9, a method of generating approximate sinusoidal wave data by linearly interpolating an adjacent measurement point from a plurality of measurement points may be used. In FIG. 9, the horizontal axis represents a rotation angle θ and the vertical axis represents an error value y. In this example, y1 to y8 indicate error values at measurement points and an error value y in a section between two adjacent measurement points is calculated in a linear interpolation process based on a linear function formula. In addition, a method using the correction table in which correction values are listed at any angles has been described in terms of the correction values in this embodiment, but the present invention is not limited thereto. For example, a method of calculating a correction value in a process within the camera every time the movable unit is driven may be used. In this case, a correction value calculation unit within the camera calculates a correction value corresponding to a rotation angle of each movable unit using the calculation formulas and driving of the pan/tilt movable unit is controlled according to a target position corrected by the correction value.

In addition, the network camera having two driving units of a pan (horizontal rotation) and a tilt (vertical rotation) has been described in this embodiment, but the present invention is not limited thereto. For example, the present invention is also applicable to an image pickup apparatus or the like having a rotation mechanism which rotates in an optical axis direction. As described above, the relevant mechanism can reduce the stop position error of the movable unit and improve the stop position accuracy when an error occurs between two positions which are in the same shooting direction but differ in positions of the movable units. In addition, a method of correcting the number of encoder pulses in an apparatus equipped with an encoder for detecting the rotation angle of the movable unit has been described in this embodiment, but the present invention is not limited thereto. For example, there is a mechanism of the movable unit configured to perform control in the number of steps of a stepping motor instead of the encoder. In this case, it is possible to correct the number of steps which is a control command value for the stepping motor according to a correction value corresponding to the number of steps as described above. This correction value is held as the correction table, or the correction value calculation unit within the camera calculates the correction value corresponding to the number of steps of the stepping motor.

Second Embodiments

Figure 11:
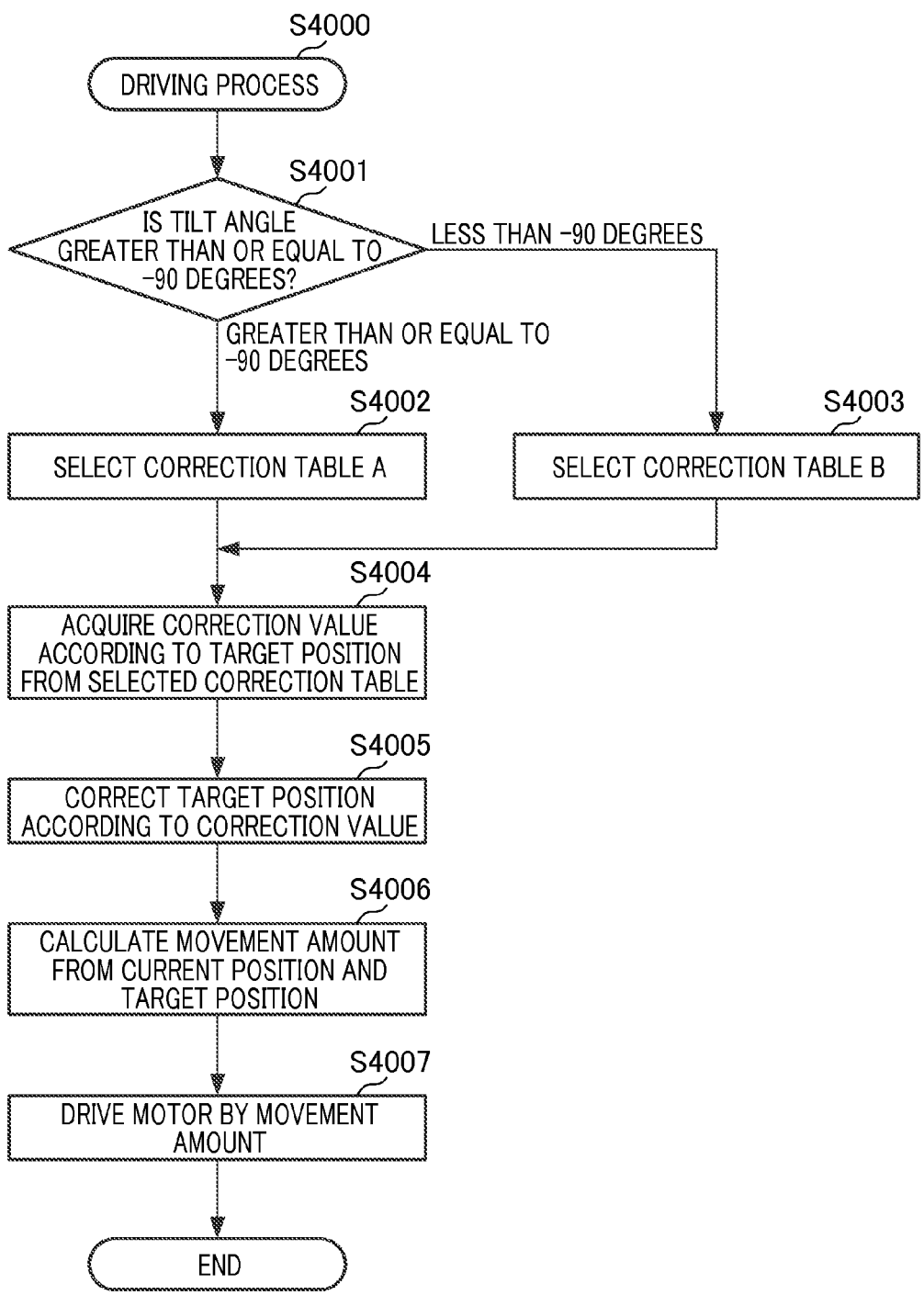
FIG. 11 is a flowchart illustrating a main process in the second embodiment of the present invention.

Next, a switching process of a plurality of correction tables will be mainly described for the second embodiments of the present invention with reference to FIGS. 10 and 11. The already used reference signs are used for similar components to the first embodiments and therefore detailed description thereof will be omitted and differences from the first embodiments will be described. The same portions will be omitted from the description of other embodiments below as well.

In this embodiment, a process considering an influence of a change in the stop position error based on an orientation difference of the camera head will be described. Causes of the shift of the shooting direction at two positions which are in substantially the same shooting direction but differ in positions of movable units include influences of a shift of a rotation axis of the movable unit and shifts of the center of an optical axis of a lens and the center of an imaging sensor in addition to the causes described in the first embodiments. According to these influences, an orientation difference of the camera head, that is, a shift in an imaging range of the imaging element at the camera head position of a tilt of 0 degrees and an imaging range of the imaging element in a reversed state at the camera head position of a tilt of −180 degrees, is likely to occur. This shift is shown as the stop position error. Therefore, when the stop position error value differs according to the orientation difference of the camera head in this embodiment, two different correction values are properly used according to the orientation difference of the camera head. It is possible to reduce the stop position error because correction using a correction value differing according to the orientation difference of the camera head is performed by switching a correction value according to a change in the orientation difference of the camera head, that is, a tilt angle.

The network camera according to this embodiment is connected to a network such as a local area network (LAN) or the like and is capable of communicating with a plurality of client apparatuses (information processing apparatuses). The client apparatus displays and records a captured video of the network camera via the network. In addition, the client apparatus performs the setting of shooting conditions, a pan/tilt operation, etc. by transmitting the camera control command to the network camera. The network camera uses a plurality of correction tables to cope with a difference in the stop position error value according to the orientation difference of the camera head. For example, an error value is measured as in the method shown in the first embodiments at a camera head position of a tilt of 0 degrees and a camera head position of a tilt of −180 degrees. A correction table according to error values is generated at the camera head position of the tilt of 0 degrees and the camera head position of the tilt of −180 degrees.

FIG. 10 illustrates an example of correction tables in this embodiment. FIG. 10A illustrates a first correction table (see correction table A) at the camera head position at which a tilt angle is 0 degrees. FIG. 10B illustrates a second correction table (see correction table B) at the camera head position at which a tilt angle is −180 degrees. In each correction table, one correction value is shown for every angle.

FIG. 11 is a flowchart illustrating a pan driving process S4000 to be executed by the pan/tilt control unit 1008 when a pan driving command is received. The pan/tilt control unit 1008 moves to a process of S4001 after reception of the pan driving command.

In S4001, the pan/tilt control unit 1008 makes a determination by comparing a current tilt angle with a threshold value. Specifically, it is determined whether the current tilt angle is greater than or equal to −90 degrees. When the current tilt angle is greater than or equal to −90 degrees, the process proceeds to S4002 and the correction table A is selected. In addition, when the current tilt angle is less than −90 degrees, the process proceeds to S4003 and the correction table B is selected. For example, when the current tilt angle is −150 degrees, the correction table B is selected because the current tilt angle is less than −90 degrees. After S4002 or S4003, the process proceeds to S4004.

In S4004, the pan/tilt control unit 1008 acquires a correction value according to a target position using the correction table selected in S4002 or S4003 based on the target position designated by the pan driving command. For example, when the target position of the pan driving command is 178 degrees, a correction value of the number of encoder pulses, "11," is acquired using the correction table B of FIG. 10B. In S4005, the pan/tilt control unit 1008 corrects the number of encoder pulses of the target position according to the acquired correction value. For example, in the case of the encoder scale of 3600 pulses at 360 degrees for the pan movable unit, the number of encoder pulses in which the target position is 178 degrees becomes 1780 as illustrated in the first embodiment. When the correction value of "11" is added to the value of 1780, 1780+11=1791 and the corrected target position becomes a position of 1791 pulses.

In S4006, the pan/tilt control unit 1008 calculates the movement amount from the current position and the corrected target position. For example, when the number of encoder pulses of the current position is 300, 1791−300=1491 according to "target position−current position" and the movement amount is 1491 pulses.

In S4007, the pan/tilt control unit 1008 performs driving control on the pan driving unit 1006 according to the movement amount calculated in S4006 and this process ends.

Likewise, when a tilt driving command is received, the pan/tilt control unit 1008 corrects the tilt target position using the correction value according to a plurality of tilt correction tables and performs driving control on the tilt movable unit toward the corrected target position.

In this embodiment, a plurality of correction tables differing according to the orientation difference of the camera head are held when the stop position error value differs according to a change in an orientation difference of the camera head. The correction table to be used according to the change in the orientation difference of the camera head, that is, the tilt angle, is switched and correction according to a different error value in the orientation difference of the camera head is performed. Thereby, it is possible to further reduce the stop position error between two positions which are in the same shooting direction but differ in positions of the movable units and improve the stop position accuracy of the movable unit.

The threshold value to be used in the comparison process when the correction table is switched is −90, but the present invention is not limited thereto. For example, when the correction table is switched, it is possible to provide hysteresis characteristics so that the threshold value changes at the time of switching according to a difference in the movement direction. For example, when the hysteresis amount is 10 degrees and the tilt movable unit is in a direction in which the tilt movable unit moves from a position of 0 degrees to a position of −180 degrees, −90−10=−100 and the correction table is switched by designating a position of −100 degrees as a first threshold value. On the other hand, when the tilt movable unit is in the movement direction from a position of −180 degrees to a position of 0 degrees, −90+10=−80 and the correction table is switched by designating a position of −80 degrees as a second threshold value. Thereby, it is possible to prevent the switching of the correction table from frequently occurring in a region in the vicinity of −90 degrees.

A method of switching the correction table in two steps has been described in this embodiment, but the present invention is not limited thereto. The correction table may be switched in three or more steps. In addition, a method of calculating a correction value in a process within a camera every time the movable unit is driven and switching its calculation formula according to the tilt angle without holding the correction value as the table may be used. In addition, the present invention is not limited to a method of switching the correction value according to the tilt angle. For example, when the error value differs according to a zoom position, it is only necessary to switch the correction value according to the zoom position. According to the process described above, it is possible to further reduce the stop position error and improve the stop position accuracy of the movable unit.

Third Embodiments

Figure 12:
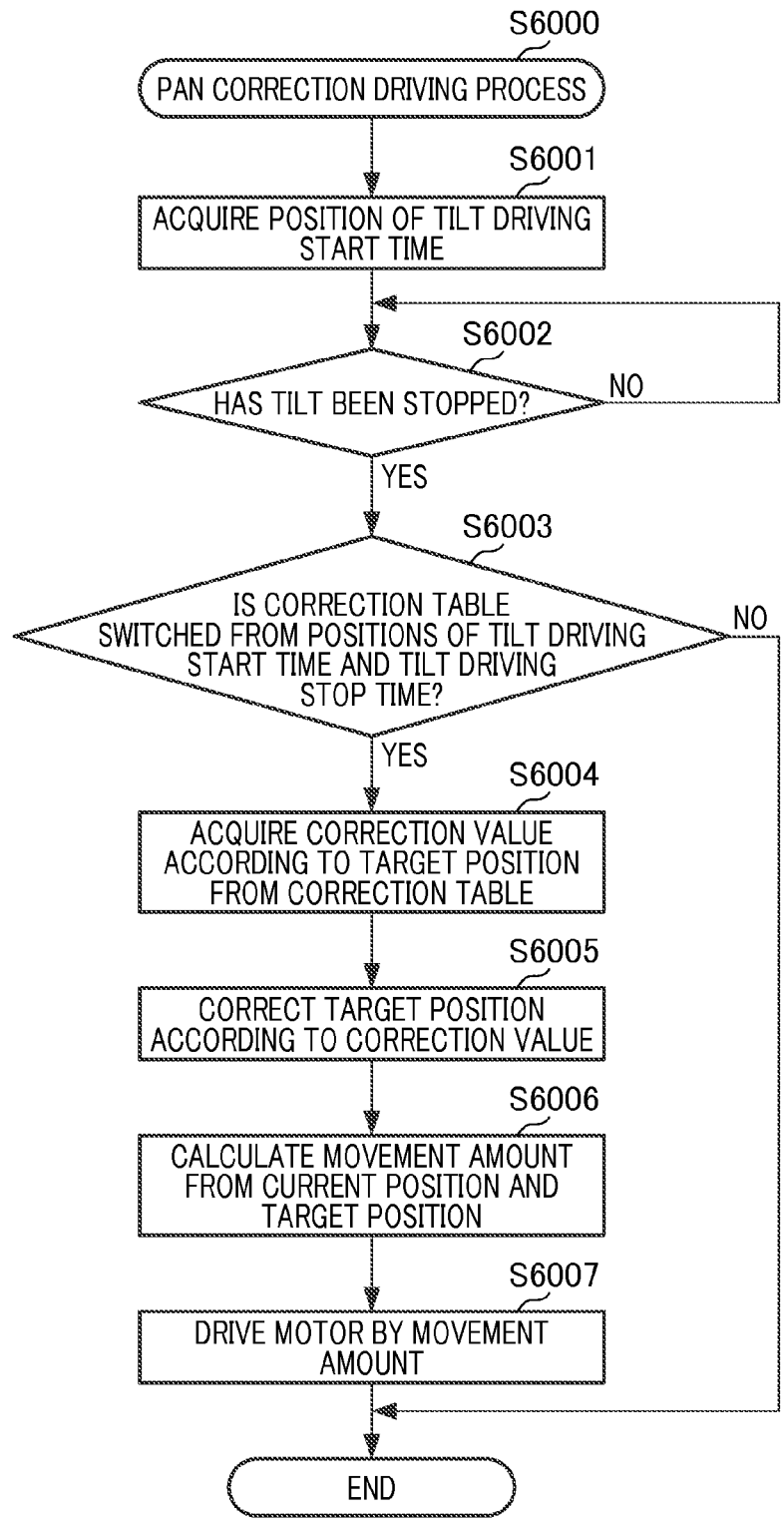
FIG. 12 is a flowchart illustrating a main process in a third embodiment of the present invention.

Hereinafter, the third embodiments of the present invention will be described with reference to FIG. 12. In this embodiment, the switching timing of a correction table will be mainly described as a difference from the first and second embodiments.

The method of switching the correction table according to an orientation difference of the camera head of the network camera has been described in the second embodiments. In the above-described method, the correction value of the pan angle is switched according to the tilt angle. When a tilt movable unit is driven simultaneously during pan driving, the correction value of the pan angle is also switched according to the tilt angle during tilt driving. Because the target position of the pan angle changes by a difference between the correction values when the correction value is switched, it is necessary to perform correction driving of the target position. For example, when the user operates the pan/tilt of the network camera using a joystick, the operation may be continuously performed while an upward/downward movement direction of the tilt operation is alternately switched. At this time, when the switching of the correction value according to the tilt operation occurs to some extent, the pan correction driving associated with the switching frequently occurs and there is a possibility of difficulty when the user views an image.

In this manner, when the operation is continuously performed while the tilt movement direction is alternately switched, pan correction driving is performed when the switching of the correction value occurs at a point in time at which the tilt operation stops without performing the pan correction driving during the tilt operation in this embodiment. Thereby, it is possible to reduce a degree of difficulty in viewing an image according to frequent occurrence of the pan correction driving. Further, the configuration of the network camera according to this embodiment is similar to the first embodiments. In addition, as in the case of the second embodiments, it is assumed that two correction tables according to the orientation difference of the camera head are held and the correction table to be used according to the orientation difference of the camera head, that is, the tilt angle, is switched.

A pan correction driving process S6000 to be executed by the pan/tilt control unit 1008 when the pan operation stops will be described with reference to the flowchart of FIG. 12.

At the time of moving to a pan stop state, the pan/tilt control unit 1008 starts the process of S6001.

In S6001, the pan/tilt control unit 1008 acquires position information of a tilt driving start time. In S6002, the pan/tilt control unit 1008 determines whether the tilt operation has stopped. When the tilt movable unit is being driven, the process returns to S6002 and waits until the tilt operation stops. In addition, when the tilt operation has stopped, the process proceeds to S6003. In S6003, the pan/tilt control unit 1008 determines whether the correction table is switched at the tilt driving start time and the tilt driving stop time. For example, when the angle at the tilt driving start position is −10 degrees and the angle at the tilt driving stop position is −150 degrees, the correction table is switched. In addition, when the angle at the tilt driving start position is −10 degrees and the angle at the tilt driving stop position is −30 degrees, the correction table is not switched. Because the pan correction driving is unnecessary when the correction table is not switched, this process ends. When the correction table is switched, the process proceeds to S6004.

In S6004, the pan/tilt control unit 1008 acquires a correction value corresponding to the target position using the correction table according to a current tilt stop position based on a target position designated by a pan driving command. For example, when the target position of the pan driving command is 178 degrees and the tilt stop position is −150 degrees, the correction value of the number of encoder pulses, "11," is acquired using the correction table B of FIG. 10B.

In S6005, the pan/tilt control unit 1008 corrects the number of encoder pulses of the target position from the acquired correction value. For example, when the number of encoder pulses in which the target position is 178 degrees is 1780 and the correction value of "11" is added to the value of 1780 in this embodiment as described in the second embodiments, 1780+11=1791 and the corrected target position becomes a position of 1791 pulses.

In S6006, the pan/tilt control unit 1008 calculates a movement amount from the current position and the target position. For example, when the number of encoder pulses of the current position is 1782, 1791−1782=9 according to "target position-current position" and the movement amount is 9 pulses.

In S6007, the pan/tilt control unit 1008 performs driving control on the pan driving unit 1006 according to the movement amount calculated in S6006 and this process ends.

When the operation is continuously performed while the tilt movement direction is switched in this embodiment, it is determined whether the correction value has been switched at the timing at which the tilt operation has stopped. When the correction value is switched at the timing at which the tilt operation has stopped, the pan correction driving is performed. Consequently, it is possible to reduce a degree of difficulty in viewing an image according to frequent occurrence of the pan correction driving associated with the continuous tilt operation.

Fourth Embodiments

Figure 13:
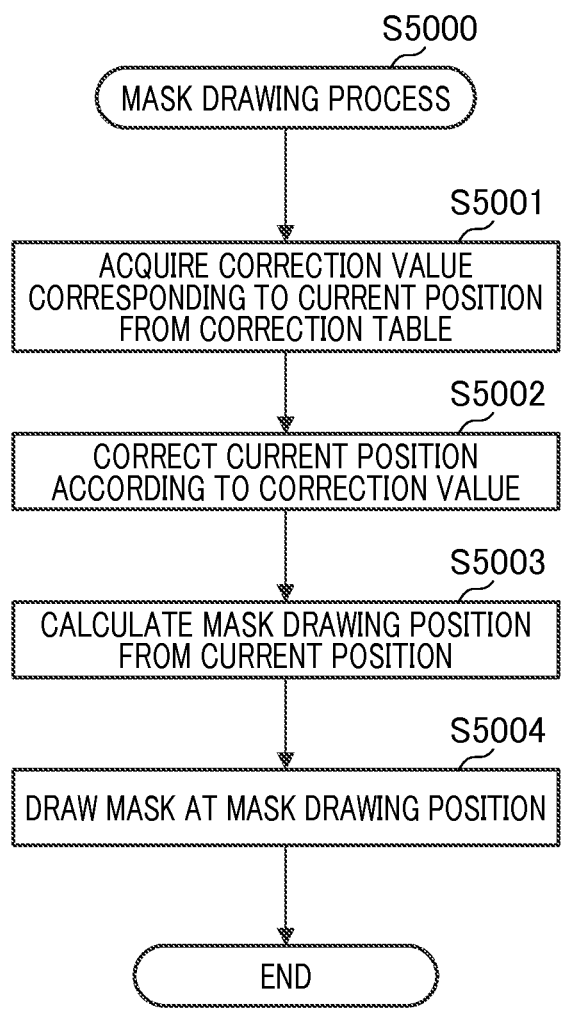
FIG. 13 is a flowchart illustrating a privacy mask drawing process in a fourth embodiment of the present invention.

Hereinafter, the fourth embodiments of the present invention will be described with reference to FIG. 13. In this embodiment, the correction of a privacy mask drawing position will be mainly described in an embodiment in which partial mask processing on an image is performed as a difference from the first, second, and third embodiments.

In the first, second, and third embodiments, the correction of the stop position error of the pan/tilt movable unit of the network camera has been described. In this embodiment, the position information of the pan/tilt movable unit by the encoder is also used at a drawing position of a privacy mask as well as a stop position. When the privacy mask is drawn, it is also necessary to follow and move the drawing position of the privacy mask according to a shooting direction which changes in association with the pan/tilt operation. When there is an error in pan/tilt position information for use in drawing of the privacy mask, a shift also occurs at the drawing position of the privacy mask naturally. In an endless turning machine, an error of the privacy mask drawing position at two positions which are in the same shooting direction but differ in positions of the movable units is likely to be larger than an error of a drawing position at one position. Because a correction value for correcting the pan/tilt position information including the error to a correct value is held and the privacy mask is drawn using the corrected pan/tilt position information in this embodiment, it is possible to draw the privacy mask at the more accurate position. In addition, when a stepping motor is used in a driving source of the movable unit, a position at which the movable unit can stop and the stop resolution are determined by a step angle of the stepping motor and the stop at a position of a smaller angle is difficult. When the detection resolution of the detection angle of the movable unit by the encoder is higher than the stop resolution and the detection angle by the encoder is used at the drawing position of the privacy mask, an error may occur due to a limit of stop resolution as the stop position of the movable unit. However, it is possible to draw the privacy mask at the more accurate position as the drawing position of the privacy mask due to the high detection resolution of the encoder.

A privacy mask drawing process S5000 to be executed by the image processing unit 1002 will be described with reference to the flowchart of FIG. 13. When the imaging unit 1001 ends a developing process of image data, the image processing unit 1002 starts the privacy mask drawing process S5000.

In S5001, the image processing unit 1002 acquires a correction value corresponding to a current position using the correction table from the current position. For example, when the current position of the pan operation is 178 degrees, the correction vale of "−2" of the number of encoder pulses is assumed to be acquired using the correction table. In step S5002, the image processing unit 1002 corrects the number of encoder pulses of the current position according to the acquired correction value. For example, in the case of the encoder scale of 3600 pulses at 360 degrees for the pan movable unit, the current number of pan encoder pulses is 1782 and 1782−2=1780. When the number of encoder pulses is converted into an angle value, 1780×360/3600=178 and the corrected current position is 178 degrees.

In S5003, the image processing unit 1002 calculates the mask drawing position from the current position after correction. For example, when a horizontal angle of view is 10 degrees at a current pan position of 178 degrees, an angle of view of horizontal shooting is in a range from 173 degrees to 183 degrees. In addition, if the mask drawing position of the horizontal direction of the image is converted from the angle of view into the number of pixels when the mask drawing position is 176 degrees in the horizontal direction, (176−173)×1280/10=384 and the number of pixels is 384.

Even for the mask drawing position of the vertical direction of the image, as described above, the image processing unit 1002 corrects the current position in the tilt direction using the correction value according to the tilt correction table and calculates the mask drawing position from the corrected current position.

In S5004, the image processing unit 1002 executes a process of drawing the mask at the calculated mask drawing position. For example, a process of superimposing a rectangular black image on a mask drawing position is performed, the captured image is processed so that the image is partially invisible, and this process ends.

In this embodiment, the current position is corrected using correction values for two positions which are in the same shooting direction but differ in positions of the movable units. Thereby, it is possible to reduce a drawing position error of the privacy mask between the two positions that differ in positions of the movable units.

A method using a correction table in which correction values at any angles are listed in this embodiment, but the present invention is not limited thereto. For example, a method of calculating a correction value in a process within a camera every time the mask drawing process is performed may be performed. In this case, the correction value calculation unit within the camera calculates the correction value corresponding to the rotation angle of each movable unit and the mask drawing position is determined according to the current position corrected by the correction value. In addition, a method using one correction value in the correction of the current position has been described in this embodiment, but the present invention is not limited thereto. For example, when the error value differs according to a tilt angle or zoom position, the correction value changes according to the tilt angle or the zoom position. Even in this case, it is possible to reduce the position error of the privacy mask drawing according to a similar process. In addition, the present invention is not limited to a camera having two driving units for the pan (horizontal rotation) and tilt (vertical rotation), and is also applicable an apparatus having another driving unit. For example, likewise, the case in which an error occurs between two different positions which are in the same shooting direction but differ in positions of the movable units according to the relevant mechanism in an apparatus having a rotation mechanism which rotates in an optical axis direction may be included. Even in this case, it is possible to reduce the drawing position error of the privacy mask according to a similar process to the above description. In addition, the number of steps of the stepping motor is corrected in the case of a mechanism having a movable unit for performing control in the number of steps of the stepping motor without mounting an encoder for detecting the rotation angle of the movable unit. In this case, the correction value calculation unit within the camera calculates the correction value corresponding to the number of steps which is a control command value for the stepping motor. It is possible to reduce the mask drawing position error according to a similar process to the above description by correcting the drawing position of the privacy mask using the correction value.

While preferred embodiments of the present invention have been described, the present invention is not limited to the embodiment and various modifications or changes are possible within the scope of the subject matter of the invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-228714, filed Nov. 11, 2014, which is hereby incorporated by reference wherein in its entirety.

What is claimed is:

1. An image pickup apparatus comprising:
    an imaging unit;
    a plurality of driving units configured to change a shooting direction of the imaging unit by driving each of a plurality of movable units having different driving directions;
    a detection unit configured to detect rotation angles of the plurality of movable units; and
    a driving control unit configured to acquire the rotation angles detected by the detection unit to control the plurality of driving units,
    wherein the driving control unit corrects a target position of each movable unit according to a correction value corresponding to the rotation angle of the movable unit with respect to a plurality of different positions of the plurality of movable units when the imaging unit capture in the same shooting direction in order to control each driving unit by using a corrected value,
    wherein the image pickup apparatus comprises a plurality of correction tables each including the correction value corresponding to the rotation angle of the movable unit, and the driving control unit selects any one of the plurality of correction tables through a determination by comparing the rotation angle of the movable unit with a threshold value and acquires the correction value corresponding to the rotation angle of the movable unit using the selected correction table.

2. The image pickup apparatus according to claim 1, comprising:

a correction value calculation unit configured to calculate the correction value corresponding to the rotation angle of the movable unit, wherein the driving control unit controls the driving unit using a value obtained by correcting the target position of the movable unit according to the correction value calculated by the correction value calculation unit.

3. The image pickup apparatus according to claim 1, wherein the plurality of movable units are a movable unit related to a panning operation of the imaging unit and a movable unit related to a tilting operation of the imaging unit.

4. An image pickup apparatus comprising:

an imaging unit;

a plurality of driving units configured to change a shooting direction of the imaging unit by driving each of a plurality of movable units having different driving directions;

a detection unit configured to detect rotation angles of the plurality of movable units; and a driving control unit configured to acquire the rotation angles detected by the detection unit to control the plurality of driving units, wherein the driving control unit corrects a target position of each movable unit according to a correction value corresponding to the rotation angle of the movable unit with respect to a plurality of different positions of the plurality of movable units when the imaging unit capture in the same shooting direction in order to control each driving unit by using a corrected value, wherein the plurality of driving units include a first driving unit configured to drive a first movable unit and a second driving unit configured to drive a second movable unit, and wherein the driving control unit acquires a rotation angle of the second movable unit from the detection unit when the driving of the second movable unit is started by the second driving unit while the first driving unit is stopped, further corrects a target position of the first movable unit according to the correction value obtained from the rotation angle of the second movable unit when the driving of the second movable unit is started and the rotation angle of the second movable unit when the driving of the second movable unit is stopped while the second driving unit is stopped, and controls the first driving unit using a corrected value.

5. The image pickup apparatus according to claim 4, comprising:

a correction table including the correction value corresponding to the rotation angle of the movable unit, wherein the driving control unit acquires the correction value corresponding to the rotation angle of the movable unit using the correction table.

6. The image pickup apparatus according to claim 4, wherein the correction value for the target position of the first movable unit is a plurality of correction values differing according to each shooting direction of the imaging unit changed according to the driving of the second movable unit, and wherein, when the first driving unit is stopped and switching of the plurality of correction values occurs from a rotation angle of the second movable unit when the driving of the second movable unit is started and a rotation angle of the second movable unit when the driving of the second movable unit is stopped, the driving control unit corrects a target position of the first movable unit according to the correction value switched when the second driving unit is stopped and controls the first driving unit using a corrected value.

7. An image pickup apparatus comprising:

an imaging unit;

a plurality of driving units configured to change a shooting direction of the imaging unit by driving each of a plurality of movable units having different driving directions;

a detection unit configured to detect rotation angles of the plurality of movable units; and an image processing unit configured to process an image captured by the imaging unit and to perform a process of drawing partially masked image to the image, wherein the image processing unit corrects a rotation angle detected by the detection unit using a correction value corresponding to a rotation angle of each movable unit with respect to a plurality of different positions of the plurality of movable units when the imaging unit capture in the same shooting direction in order to perform a process of drawing the masked image at a drawing position calculated by using a corrected value, wherein the image pickup apparatus comprises a plurality of correction tables each including the correction value corresponding to the rotation angle of the movable unit, and wherein any one of the plurality of correction tables is selected through a determination by comparing the rotation angle of the movable unit with a threshold value and the correction value corresponding to the rotation angle of the movable unit is acquired using the selected correction table.

8. An image pickup apparatus comprising:

an imaging unit;

a plurality of driving units configured to change a shooting direction of the imaging unit by driving each of a plurality of movable units having different driving directions; and a driving control unit configured to control the plurality of driving units, wherein the driving control unit corrects a control command value for each driving unit using a correction value corresponding to a rotation angle of each movable unit with respect to a plurality of different positions of the plurality of movable units when the imaging unit capture in the same shooting direction in order to control the driving unit according to a corrected value, wherein the image pickup apparatus comprises a plurality of correction tables each including the correction value corresponding to the rotation angle of the movable unit, and the driving control unit selects any one of the plurality of correction tables through a determination by comparing the rotation angle of the movable unit with a threshold value and acquires the correction value corresponding to the rotation angle of the movable unit using the selected correction table.

9. The image pickup apparatus according to claim 8, wherein the driving unit has a stepping motor configured to drive the movable unit, and wherein the driving control unit corrects the number of steps of the stepping motor according to the correction value corresponding to the rotation angle of the movable unit.

10. A control method to be executed by an image pickup apparatus including an imaging unit, a plurality of driving units configured to change a shooting direction of the imaging unit by driving each of a plurality of movable units having different driving directions, a detection unit configured to detect rotation angles of the plurality of movable units, and a driving control unit configured to acquire the rotation angles detected by the detection unit to control the plurality of driving units, the method comprising:

detecting, by the detection unit, a rotation angle of each movable unit;

acquiring, by the driving control unit, the rotation angle detected by the detection unit;

correcting, by the driving control unit, a target position of each movable unit according to a correction value corresponding to the rotation angle of the movable unit with respect to a plurality of different positions of the plurality of movable units when the imaging unit capture in the same shooting direction; and controlling, by the driving control unit, each driving unit using a corrected value, wherein the image pickup apparatus comprises a plurality of correction tables each including the correction value corresponding to the rotation angle of the movable unit, and in the correcting, any one of the plurality of correction tables is selected through a determination by comparing the rotation angle of the movable unit with a threshold value and the correction value corresponding to the rotation angle of the movable unit is acquired using the selected correction table.

11. A control method to be executed by an image pickup apparatus including an imaging unit, a plurality of driving units configured to change a shooting direction of the imaging unit by driving each of a plurality of movable units having different driving directions, a detection unit configured to detect rotation angles of the plurality of movable units, and an image processing unit configured to process an image captured by the imaging unit and perform a process of drawing partially masked image to the image, the method comprising:

correcting, by the image processing unit, a rotation angle detected by the detection unit using a correction value corresponding to a rotation angle of each movable unit with respect to a plurality of different positions of the plurality of movable units when the imaging unit capture in the same shooting direction; and performing, by the image processing unit, a process of drawing the masked image at a drawing position calculated using a corrected value, wherein the image pickup apparatus comprises a plurality of correction tables each including the correction value corresponding to the rotation angle of the movable unit, and wherein any one of the plurality of correction tables is selected through a determination by comparing the rotation angle of the movable unit with a threshold value and the correction value corresponding to the rotation angle of the movable unit is acquired using the selected correction table.

12. A control method to be executed by an image pickup apparatus including an imaging unit, a plurality of driving units configured to change a shooting direction of the imaging unit by driving each of a plurality of movable units having different driving directions, and a driving control unit configured to control the plurality of driving units, the method comprising:

correcting, by the driving control unit, a control command value for each driving unit using a correction value corresponding to a rotation angle of each movable unit with respect to a plurality of different positions of the plurality of movable units when the imaging unit capture in the same shooting direction; and controlling, by the driving control unit, the driving unit according to a corrected value, wherein the image pickup apparatus comprises a plurality of correction tables each including the correction value corresponding to the rotation angle of the movable unit, and in the correcting, any one of the plurality of correction tables is selected through a determination by comparing the rotation angle of the movable unit with a threshold value and the correction value corresponding to the rotation angle of the movable unit is acquired using the selected correction table.

13. An image pickup apparatus comprising:

an imaging unit;

a plurality of driving units configured to change a shooting direction of the imaging unit by driving each of a plurality of movable units having different driving directions;

a detection unit configured to detect rotation angles of the plurality of movable units; and an image processing unit configured to process an image captured by the imaging unit and to perform a process of drawing partially masked image to the image, wherein the image processing unit corrects a rotation angle detected by the detection unit using a correction value corresponding to a rotation angle of each movable unit with respect to a plurality of different positions of the plurality of movable units when the imaging unit capture in the same shooting direction in order to perform a process of drawing the masked image at a drawing position calculated by using a corrected value, wherein the plurality of driving units include a first driving unit configured to drive a first movable unit and a second driving unit configured to drive a second movable unit, and wherein a rotation angle of the second movable unit is acquired from the detection unit when the driving of the second movable unit is started by the second driving unit while the first driving unit is stopped, a target position of the first movable unit is corrected according to the correction value obtained from the rotation angle of the second movable unit when the driving of the second movable unit is started and the rotation angle of the second movable unit when the driving of the second movable unit is stopped while the second driving unit is stopped, and the first driving unit is controlled using a corrected value.

14. An image pickup apparatus comprising:

an imaging unit;

a plurality of driving units configured to change a shooting direction of the imaging unit by driving each of a plurality of movable units having different driving directions; and a driving control unit configured to control the plurality of driving units, wherein the driving control unit corrects a control command value for each driving unit using a correction value corresponding to a rotation angle of each movable unit with respect to a plurality of different positions of the plurality of movable units when the imaging unit capture in the same shooting direction in order to control the driving unit according to a corrected value, wherein the plurality of driving units include a first driving unit configured to drive a first movable unit and a second driving unit configured to drive a second movable unit, and wherein the driving control unit acquires a rotation angle of the second movable unit when the driving of the second movable unit is started by the second driving unit while the first driving unit is stopped, further corrects a target position of the first movable unit according to the correction value obtained from the rotation angle of the second movable unit when the driving of the second movable unit is started and the rotation angle of the second movable unit when the driving of the second movable unit is stopped while the second driving unit is stopped, and controls the first driving unit using a corrected value.

15. A control method to be executed by an image pickup apparatus including an imaging unit, a plurality of driving units configured to change a shooting direction of the imaging unit by driving each of a plurality of movable units having different driving directions, a detection unit configured to detect rotation angles of the plurality of movable units, and a driving control unit configured to acquire the rotation angles detected by the detection unit to control the plurality of driving units, the method comprising:
  detecting, by the detection unit, a rotation angle of each movable unit;
  acquiring, by the driving control unit, the rotation angle detected by the detection unit;
  correcting, by the driving control unit, a target position of each movable unit according to a correction value corresponding to the rotation angle of the movable unit with respect to a plurality of different positions of the plurality of movable units when the imaging unit capture in the same shooting direction; and
  controlling, by the driving control unit, each driving unit using a corrected value,
  wherein the plurality of driving units include a first driving unit configured to drive a first movable unit and a second driving unit configured to drive a second movable unit, and
  wherein in the acquiring, a rotation angle of the second movable unit is acquired when the driving of the second movable unit is started by the second driving unit while the first driving unit is stopped, and in the correcting, a target position of the first movable unit is further corrected according to the correction value obtained from the rotation angle of the second movable unit when the driving of the second movable unit is started and the rotation angle of the second movable unit when the driving of the second movable unit is stopped while the second driving unit is stopped, and in the controlling, the first driving unit is controlled using a corrected value.

16. A control method to be executed by an image pickup apparatus including an imaging unit, a plurality of driving units configured to change a shooting direction of the imaging unit by driving each of a plurality of movable units having different driving directions, a detection unit configured to detect rotation angles of the plurality of movable units, and an image processing unit configured to process an image captured by the imaging unit and perform a process of drawing partially masked image to the image, the method comprising:
  correcting, by the image processing unit, a rotation angle detected by the detection unit using a correction value corresponding to a rotation angle of each movable unit with respect to a plurality of different positions of the plurality of movable units when the imaging unit capture in the same shooting direction; and
  performing, by the image processing unit, a process of drawing the masked image at a drawing position calculated using a corrected value,
  wherein the plurality of driving units include a first driving unit configured to drive a first movable unit and a second driving unit configured to drive a second movable unit, and
  wherein a rotation angle of the second movable unit is acquired from the detection unit when the driving of the second movable unit is started by the second driving unit while the first driving unit is stopped, a target position of the first movable unit is corrected according to the correction value obtained from the rotation angle of the second movable unit when the driving of the second movable unit is started and the rotation angle of the second movable unit when the driving of the second movable unit is stopped while the second driving unit is stopped, and the first driving unit is controlled using a corrected value.

17. A control method to be executed by an image pickup apparatus including an imaging unit, a plurality of driving units configured to change a shooting direction of the imaging unit by driving each of a plurality of movable units having different driving directions, and a driving control unit configured to control the plurality of driving units, the method comprising:
  correcting, by the driving control unit, a control command value for each driving unit using a correction value corresponding to a rotation angle of each movable unit with respect to a plurality of different positions of the plurality of movable units when the imaging unit capture in the same shooting direction; and
  controlling, by the driving control unit, the driving unit according to a corrected value,
  wherein the plurality of driving units include a first driving unit configured to drive a first movable unit and a second driving unit configured to drive a second movable unit, and
  wherein a rotation angle of the second movable unit is acquired when the driving of the second movable unit is started by the second driving unit while the first driving unit is stopped, and in the correcting, a target position of the first movable unit is corrected according to the correction value obtained from the rotation angle of the second movable unit when the driving of the second movable unit is started and the rotation angle of the second movable unit when the driving of the second movable unit is stopped while the second driving unit is stopped, and the first driving unit is controlled using a corrected value.

* * * * *